(12) United States Patent
Lee et al.

(10) Patent No.: US 7,127,735 B1
(45) Date of Patent: Oct. 24, 2006

(54) VIDEO-ON-DEMAND SYSTEM AND VIDEO VIEWING ASSISTING METHOD

(75) Inventors: Jin Soo Lee, Seoul (KR); Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/573,225

(22) Filed: May 19, 2000

(30) Foreign Application Priority Data

Jun. 2, 1999 (KR) .............................. 1999-020263

(51) Int. Cl.
H04N 7/173 (2006.01)

(52) U.S. Cl. .................... 725/87; 725/88; 725/101; 725/102; 725/104

(58) Field of Classification Search .......... 725/86–104, 725/134, 142
See application file for complete search history.

(56) References Cited

U.S. PATENT DOCUMENTS

| | | | | |
|---|---|---|---|---|
| 5,461,415 A | * | 10/1995 | Wolf et al. ................... 725/88 |
| 5,557,317 A | * | 9/1996 | Nishio et al. ................. 725/92 |
| 5,572,728 A | * | 11/1996 | Tada et al. .................. 707/200 |
| 5,583,561 A | * | 12/1996 | Baker et al. .................. 725/93 |
| 5,631,694 A | * | 5/1997 | Aggarwal et al. ............. 725/93 |
| 5,657,072 A | * | 8/1997 | Aristides et al. .............. 725/46 |
| 5,703,655 A | * | 12/1997 | Corey et al. ................ 348/468 |
| 5,721,829 A | * | 2/1998 | Dunn et al. ................... 725/87 |
| 5,752,160 A | * | 5/1998 | Dunn .......................... 725/93 |
| 5,790,173 A | * | 8/1998 | Strauss et al. .............. 725/114 |
| 5,791,907 A | * | 8/1998 | Ramshaw et al. .......... 434/262 |
| 5,815,662 A | * | 9/1998 | Ong ............................ 725/92 |
| 5,818,439 A | * | 10/1998 | Nagasaka et al. ............. 725/87 |
| 5,821,945 A | * | 10/1998 | Yeo et al. .................... 345/440 |
| 5,835,667 A | * | 11/1998 | Wactlar et al. ............... 386/96 |
| 5,873,022 A | * | 2/1999 | Huizer et al. ................ 725/100 |
| 5,915,096 A | * | 6/1999 | Rosenzweig et al. ........ 709/227 |
| 5,928,327 A | * | 7/1999 | Wang et al. ................... 725/88 |
| 5,960,448 A | * | 9/1999 | Reichek et al. ............. 715/526 |
| 5,995,095 A | * | 11/1999 | Ratakonda ................ 715/500.1 |
| 6,018,765 A | * | 1/2000 | Durana et al. .............. 709/217 |
| 6,020,912 A | * | 2/2000 | De Lang ...................... 725/91 |
| 6,088,722 A | * | 7/2000 | Herz et al. .................. 709/217 |
| 6,177,931 B1 | * | 1/2001 | Alexander et al. ............. 725/52 |
| 6,219,837 B1 | * | 4/2001 | Yeo et al. ...................... 725/38 |
| 6,263,507 B1 | * | 7/2001 | Ahmad et al. .............. 725/134 |
| 6,378,129 B1 | * | 4/2002 | Zetts ........................... 725/94 |
| 6,392,664 B1 | * | 5/2002 | White et al. ................. 345/717 |
| 6,438,693 B1 | * | 8/2002 | Nakano ...................... 713/189 |

(Continued)

*Primary Examiner*—Chris Kelly
*Assistant Examiner*—Annan Q. Shang
(74) *Attorney, Agent, or Firm*—Fleshner & Kim, LLP (57) ABSTRACT

A video-on-demand (VOD) system and method which efficiently enables a user to resume viewing of a video program from an interrupted position is disclosed. The present invention allows the user to resume viewing of a video program even if the user requests a resumption of the interrupted video program several times or through different video servers. Particularly, the video viewing characteristic information of a user terminal is not managed by a video server of the VOD system, but is managed by the user terminal. Accordingly, when a user interrupts viewing of a video program, the video server transmits to the user terminal user profile information which includes the characteristic information related to the viewing of the video program. Thereafter, if the user requests resumption of the interrupted video program using the user profile information, the video server re-transmits the video program from the interrupted position of the video program.

7 Claims, 6 Drawing Sheets

U.S. PATENT DOCUMENTS

| | | | |
|---|---|---|---|
| 6,510,554 B1 * | 1/2003 | Gordon et al. | 725/90 |
| 6,543,053 B1 * | 4/2003 | Li et al. | 725/88 |
| 6,711,741 B1 * | 3/2004 | Yeo | 725/87 |
| 6,751,802 B1 * | 6/2004 | Huizer et al. | 725/90 |
| 6,880,171 B1 * | 4/2005 | Ahmad et al. | 725/134 |
| 2003/0037068 A1 * | 2/2003 | Thomas et al. | 707/200 |

* cited by examiner

| Video ID | POSITION |
|---|---|
| P13 (RED) | #10325 |
|  |  |

FIG.3B

| Video Type | Video ID | POSITION |
|---|---|---|
| Type 1 | P13 (RED) | #10325 |
| Series | S02 (RED) | #0 |

VIDEO-ON-DEMAND SYSTEM AND VIDEO VIEWING ASSISTING METHOD

BACKGROUND OF THE INVENTION

1. Field of the Invention

The present invention relates to a video-on-demand (VOD) system, and more particularly to a user oriented VOD system which enables a user to resume viewing of a specific video program after an interruption.

2. Background of the Related Art

Generally, a video-on-demand service stores programs such as movies, sports and educational programs in a main computer to allow a user to freely select and view a program at any time period. Particularly, the VOD service provides multimedia data including text, audio and video data. For example, character data is transmitted with a transmission speed of 28.8 Kbps, audio data is transmitted with a transmission speed of 64 Kbps based on telephone lines, and video data is transmitted with a transmission speed of 1.5 Mbps based on MPEG-1 standard. Thus, the VOD service enables a user to view a program selected according to the individual taste, regardless of the time, as well as allow users to play, rewind, pause and record the program as in a video cassette recorder (VCR) FIG. 1A is a block diagram of a general VOD system.

Figure 1A:
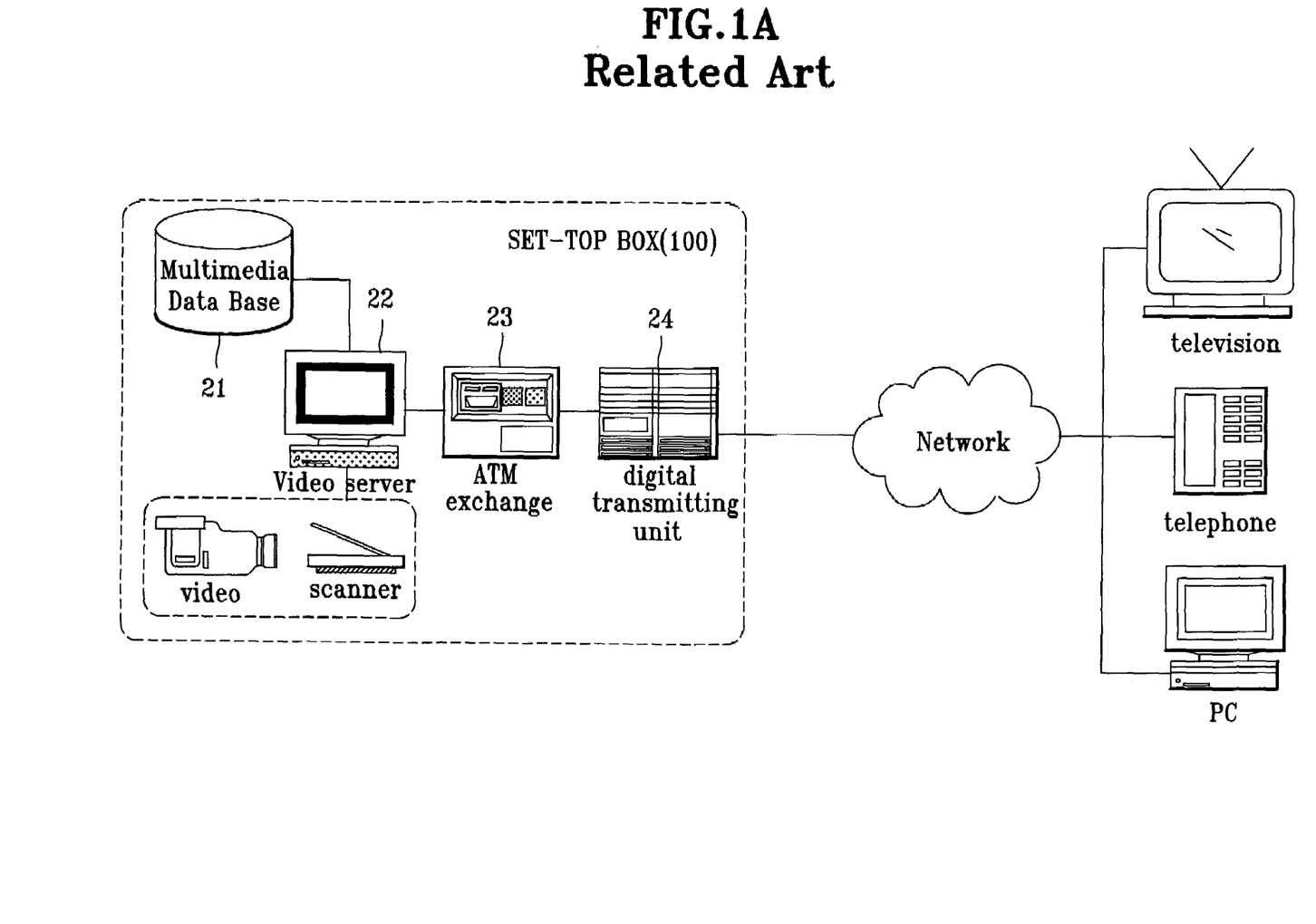
FIGS. 1A and 1B are block diagrams of a general VDT system and VOD system in the related art.

Referring to FIG. 1A, a video server 22 provides general VCR functions such as play, rewind, and fast forward, when requested by users. The video server 22 can be implemented by developing a dedicated hardware for extracting video streams from a hard disk drive, independent from the performance of a central processing unit (CPU). A multimedia database 21 allows the storage and access to extensive multimedia data of various sizes such as text, image, animation, audio, and video. Also, the database 21 includes data to support a search of a particular data. Thus, the database 21 has an index structure and search algorithm for searching the media.

An asynchronous transfer mode (ATM) exchange or switch 23 connects the video server 22 to a subscriber loop through the digital transmitting unit 24. The digital transmitting unit 24 may be an asymmetric digital subscriber line (ADSL) type using the existing telephone lines, a hybrid network type using a coaxial cable and optical fiber, or an ADSL type capable of transmitting compressed information using the existing 2-line subscriber lines. Because a service can be provided using the existing telephone lines, an ADSL digital transmitting unit 24 is more advantageous.

A set-top box (STB) 100 is a repeater which restores the original digital video signal from a compressed digital video signal transmitted from the server. The STB 100 also converts the restored digital video signal into an analog video signal and transfers the analog video signal to a subscriber device. Thereafter, the STB 100 processes a signal from a subscriber through an input device such as a remote control and performs a network connection function.

Figure 1B:
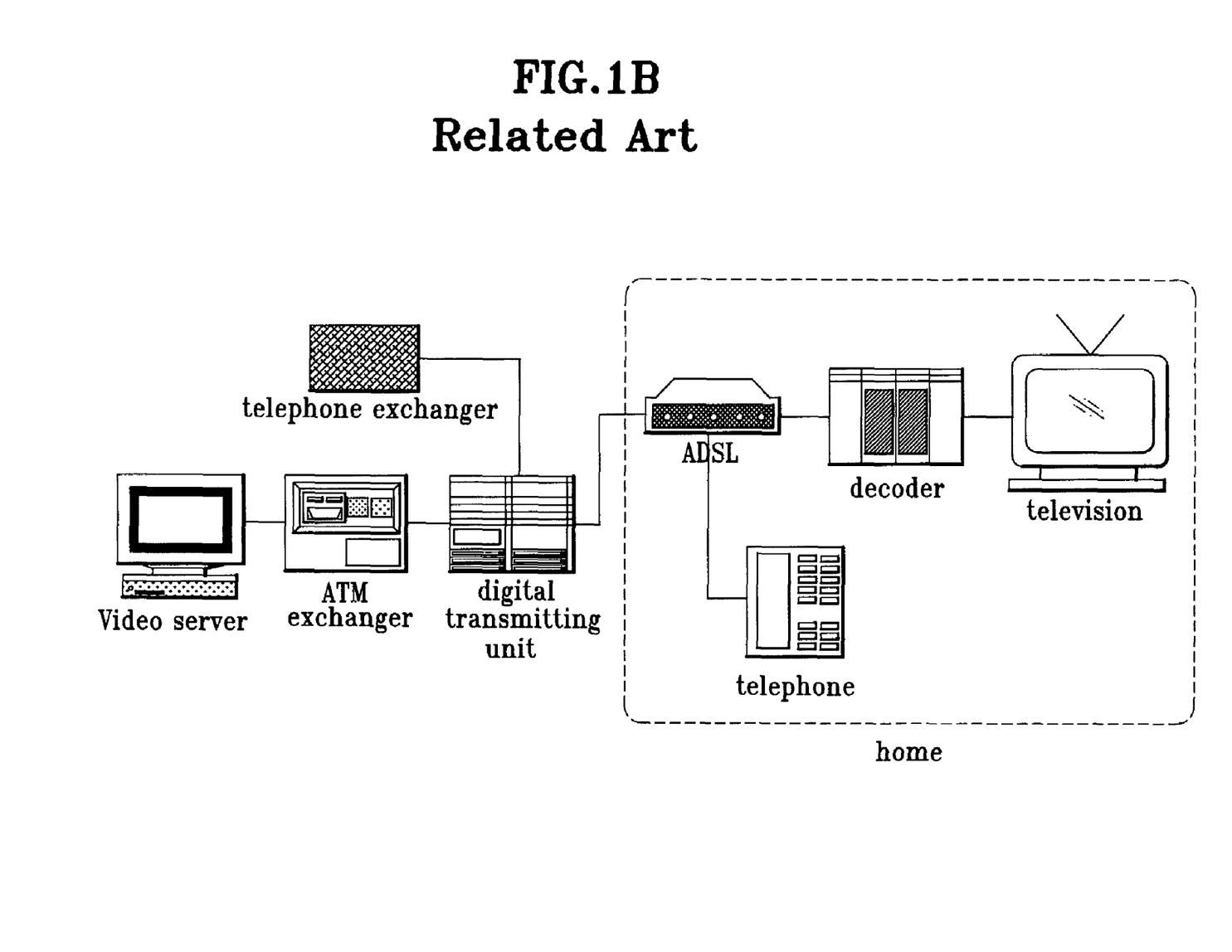

To provide the VOD service as described above, a communication network of a high-speed and a large-capacity optical fiber are necessary. However, in regions or countries where a foundation has not been built, a video-dial-tone (VDT) service, as shown in FIG. 1B, using telephone lines has been established as a phase prior to a complete VOD service. The VOD service may also be provided under the existing local area network (LAN) environment.

Generally, when a user wishes to a certain program, the user can view the program by connecting to the VOD system and selecting the program. If the user cannot view the whole program at one time, the VOD allows the user to view the program in multiple sittings. For example, U.S. Pat. No. 5,818,439 discloses a VOD system including a video server that manages users as subscribers and stores a position at which a user stops viewing a program. Thereafter, if the same user requests viewing of the same program, the video server displays the program from the position at which the viewing of the program has been interrupted. At this time, the VOD system may also display the contents of the previously viewed portion of the program by a summary using still images.

Therefore, according to the VOD system in the related art, when the user resumes viewing of a program after an interruption, the user must connect to the same video server that previously provided the VOD service, because only the same video server stores the position at which the viewing was stopped. However, if the same video server is being used by another subscriber, the video server cannot provide the interrupted program to the user until there are enough resources. In such case, the user may use a different server to view another program or the interrupted program by manually forwarding to the position at which the viewing was stopped. This causes the user inconvenience.

Also, when many users stops viewing programs in the middle of the program, the corresponding server must continuously maintain and manage the position information of the interrupted programs, regardless of whether the users will resume viewing the interrupting program. Thus, the load of the video servers increase while the maintenance and management of the whole system become more complicated. Moreover, because the system provides users with contents of the previous viewing based on still images, when a user resumes viewing an interrupted program, the contents may not be clearly comprehensive.

SUMMARY OF THE INVENTION

Accordingly, an object of the present invention is to solve at least the problems and disadvantages of the related art.

An object of the present invention is to provide a user oriented VOD system and method which enables a user to resume viewing a specified program from a portion at which the viewing was interrupted by the user, regardless of the video server.

Another object of the present invention to provide a user oriented VOD system and method which provides a user with information on the contents of previously viewed program when the user resumes viewing an interrupted program.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the VOD system comprises a video server for managing a plurality of video programs, transmitting a specific video program in response to a request from a user terminal, producing and transmitting to the user terminal user profile information if viewing of the specific video program is interrupted by the user; a network for providing a communication path between the video server and a plurality of user terminals; and the plurality of user terminals connected to the network for respectively requesting the video server to transmit specific video programs and for displaying the video program transmitted from the video server.

In the present invention, each user terminal comprises a buffer for storing data transmitted from the video server, a decoder for decoding the stored data, a video display for displaying the decoded data, a profile writer for writing the user profile information in a specified local storage, a profile reader for reading the user profile information, and a user profile sender for sending the user profile information read out by the profile reader to the video server.

In another embodiment of the present invention, a VOD system comprises a user terminal interrupting viewing of a specific video program provided from a video server of a VOD system in the middle of the video program; the video server transmitting to the user terminal user profile information which includes characteristic information related to the viewing of the video program, for example the position to be resumed; the user terminal requesting resumption of the interrupted viewing of the same video program using the user profile information, if the resumption of the interrupted viewing is requested; and the video server re-transmitting to the user terminal the video program which corresponds to the user profile information from an interrupted position of the video program.

According to the VOD system and method of the present invention, a user profile which contains characteristic information on respective users' viewing of video programs is stored in a storage means provided in a user terminal registered in the VOD system or a local storage such as a smart card inserted in the user terminal. The user profile information is transferred to a video server which is connected to a user when the same user requests a VOD service for the same video program, such that the video server reads out the characteristic information on viewing of the video program from the user profile information.

Accordingly, if a subscriber of the VOD system requests viewing of a interrupted video program to a different video server, the video server can accurately provide the subscriber with the video program from the interrupted position of the video program without increasing the video server's load. At the same time, the subscriber can also be provided with digest information on the previously viewed portion of the corresponding video program from the VOD system.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 2:
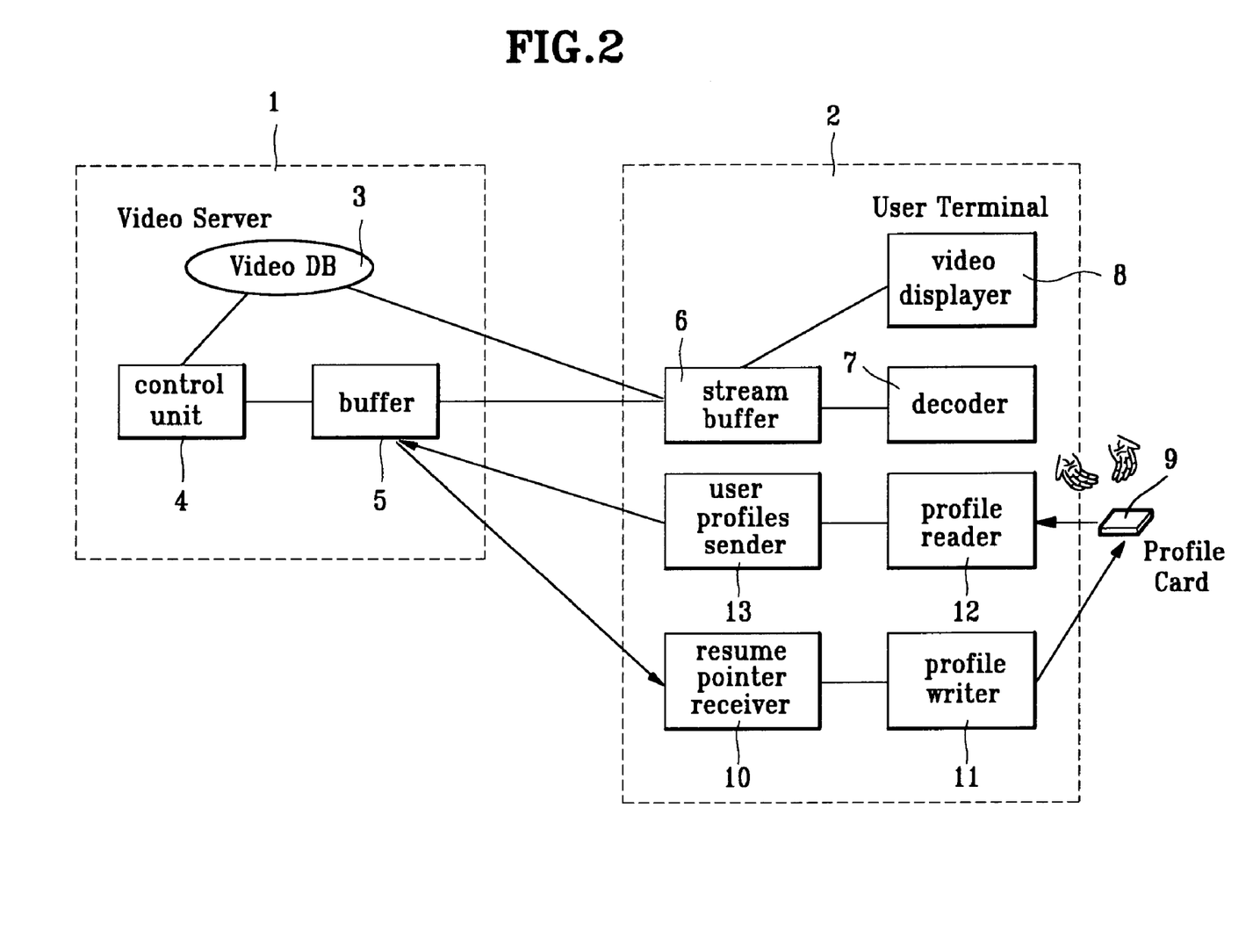
FIG. 2 is a block diagram of a VOD system according to the present invention where a video server and a user terminal are connected.

Reference will now be made in detail to the preferred embodiments of the present invention, examples of which are illustrated in the accompanying drawings. FIG. 2 is a block diagram of a VOD system according to the present invention in which a video server 1 and a user terminal 2 are connected.

Referring to FIG. 2, the video server 1 comprises a video database 3 which manages the video programs; a control unit 4 which sends a video program for a user to view upon request and controls the operations such as write, transmission, and reading of the required information; and a buffer 5 which transmits a video stream or video highlight to the user terminal 2, under the control of the control unit 4.

The user terminal 2 comprises a stream buffer 6 which stores the video stream or video highlight transmitted from the video server 1; a decoder 7 which decodes the video data stored in the stream buffer 6; a video display 8 which displays the video data decoded by the decoder 7; a resume pointer receiver 10 which receives the position information of an interrupted video program transmitted from the video server 1, if the user interrupts viewing of a video program; a profile writer 11 which writes an identifier (ID) of the interrupted video program and the position information of the interrupted video program in a profile card 9; a profile reader 12 which reads and decodes the identifier and the position information of the interrupted video program written in the profile card 9; and a user profile sender 13 which sends the identifier and the position information of the interrupted video program decoded by the profile reader 12 to the video server 1.

The operation of the VOD system according to the present invention will next be explained.

When a user terminal 2 receives a request to view a specific video program from a user, the request is transferred to the video server 1. Upon receipt, the control unit 4 retrieves the corresponding video program from the video database 3 and transmits the video program to the user terminal 2. At this time, the buffer 5 is used to temporarily store the video stream or video highlight before transmission. Similarly, the video information transmitted from the video server 1 to the user terminal 2 is temporarily stored in the stream buffer 6. The video information is then decoded by the decoder 7 and displayed through the video display 8. Accordingly, the user can view the selected video program.

However, if the user stops viewing the video program before the end of the program, i.e. interrupts viewing of the video program, the control unit 4 transmits the ID and the interrupted position of the video program to the user terminal 2, preferably and for convenience, as part of the user profile information. The resume pointer receiver 10 receives and transfers to the profile writer 11 the user profile information, which includes the ID and the interrupted position information. At this time, the ID and the interrupted position information of the video program is written on the profile card 9 inserted in the profile writer 11.

The profile card 9 may be any type of portable storage such as a magnetic card, an IC card, or a smart card. Alternatively, a local storage may be implemented in the user terminal 2 to record the profile information rather than using a portable storage as the profile card 9.

Figure 3A:
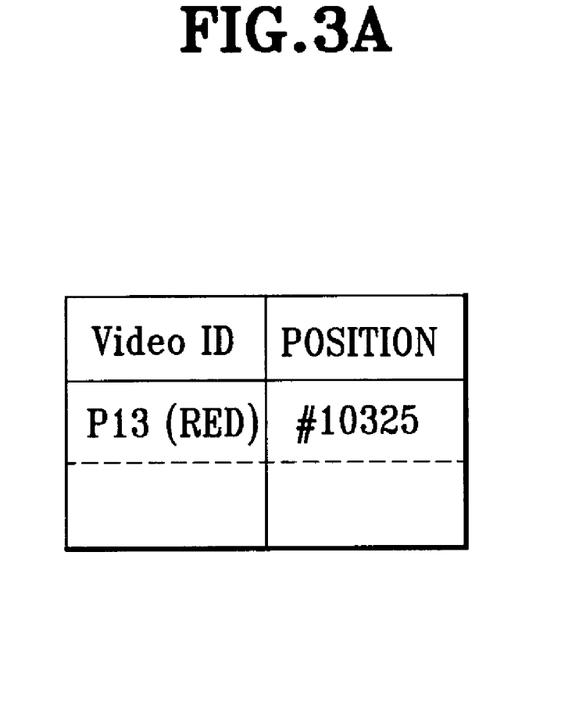
FIGS. 3A and 3B are views illustrating user profile structures according to the present invention.
Figure 3B:
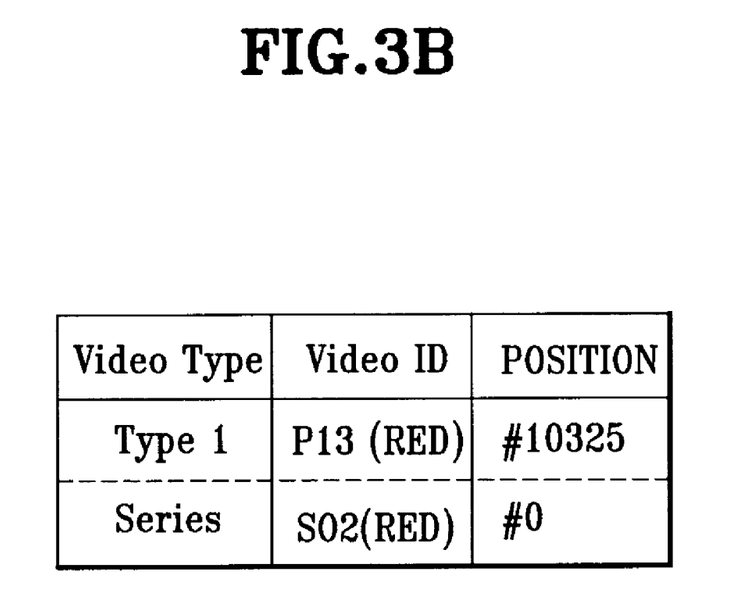

In the preferred embodiment of the present invention, every user subscribed to the VOD system has a profile information of a same structure, regardless of the video server. FIGS. 3A and 3B are examples of user profile structures according to the present invention. The user profile as shown in FIG. 3A may be composed of a video program identifier field (video ID; P13_RED) and a position information field (POSITION; #10325) of an interrupted video program. Namely, a video server can recognize that a video program "P13 (RED)" has already been viewed by the user up to the position "#10325."

Alternatively, the user profile may further comprise a video type field (video type) in addition to the profile structure of FIG. 3A, as shown in FIG. 3B. Assume for example that the type of requested program is a series, i.e. comes in a plurality of video programs. For such types, the last position of the video program viewed by the user is written in the profile, even if one video program has been viewed without interruption. Thus, the user can continuously view the remaining video programs to complete viewing the whole series. Particularly, the first row of the profile structure indicates that a video program "P13 (RED)" of a Type 1 has been viewed up to "#10325." The second row of the profile structure indicates that a video program "S02(RED)" of a Series is to be viewed next and from the beginning, i.e. the user completed viewing the video programs in the series prior to the "S02(RED)."

Accordingly, if the user wishes to resume viewing an interrupted video program, the user terminal 2 reads the identifier and the interrupted position information of the video program from the user profile card 9 through the profile reader 12, and transmits the information to the video server 1 through the user profile sender 13. The video server 1 then analyzes the user profile information and transmits to the user terminal 2 the corresponding video program from the interrupted position of the video program. Specifically, the control unit 4 identifies the corresponding video program stored in the video database 3 by using the identifier and the position information of the interrupted video program in the profile, and transmits the remaining portion of the interrupted video program to the user terminal 2.

In the system above, the resume pointer receiver 10 may be omitted if the identifier of the video program is transmitted when the user initially views the video program. In such case, the user terminal 2 can identify the interrupted position of the video program without having to receive the position information from the video server 1. Namely, the user terminal 2 can directly write the identifier and the position information of the interrupted video program on the profile card 9 through the profile writer 11. Accordingly, the resume pointer receiver 10 may be omitted as well as a transmission of the interrupted position information by the video server 1, when the user interrupts viewing a video program.

Figure 4:
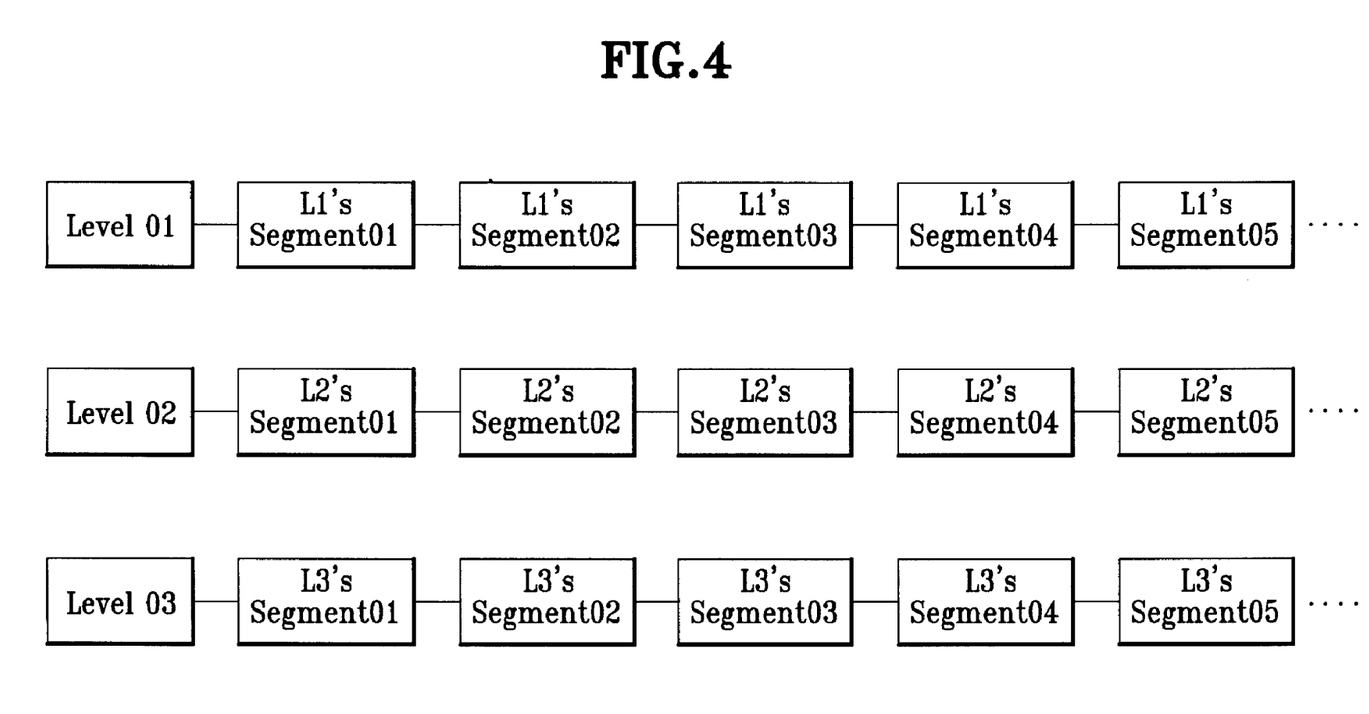
FIG. 4 is a view illustrating a first structure of digest information on previously viewed video program when resuming viewing of an interrupted video program in the VOD system according to the present invention.
Figure 5:
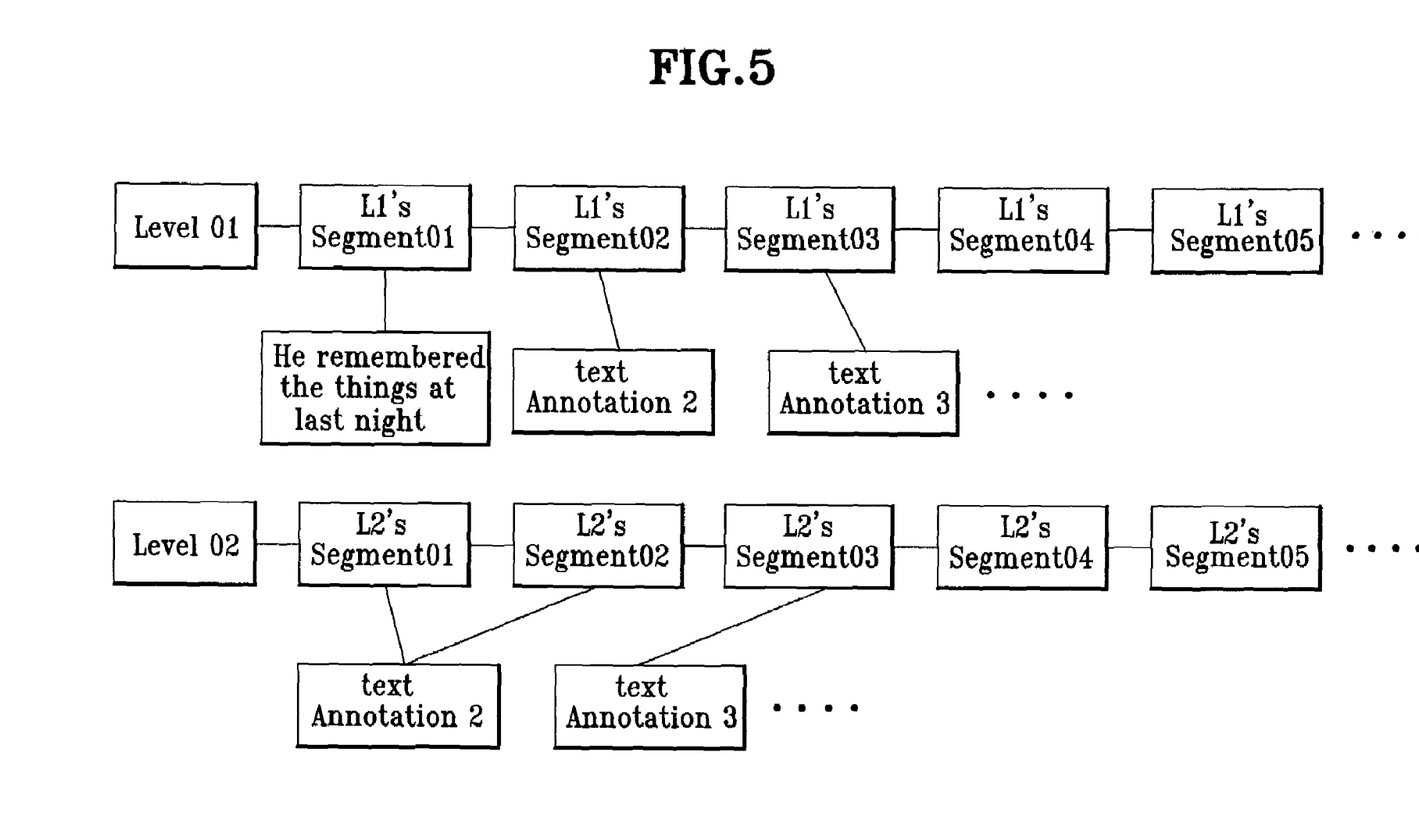
FIG. 5 is a view illustrating a second structure of digest information on previously viewed video program when resuming viewing of an interrupted video program in the VOD system according to the present invention.

Moreover, when resuming to view a program, allowing the user to view a summary of the previously viewed program would refresh the user's memory for a more enjoyable viewing of the remaining program. Thus, in the present invention, the control unit 4 of the video server 1 utilizes a digest information when a user wishes to view a summary before resuming to view a program. Particularly, in the preferred embodiment, a digest information is constructed in advance for each video program. Accordingly, when a user stops viewing a program in the middle of the program, the control unit 4 constructs a summary of the corresponding video program utilizing the digest information. Thereafter, the control unit 4 transmits the summary to the user terminal 2 through the buffer 5, when the user resumes viewing of the program. FIGS. 4 and 5 show structures of the digest information on the previously viewed video program according to the present invention.

FIG. 4 shows a digest information structure with three levels of detail. Namely, each level comprises of a plurality of video segments 1~n, where each segment summarizes the contents of a corresponding time segment of a program, thereby summarizing the whole program. Also, as the level increases from 01 to 03, the detail of the summary in each segment rises, increasing the display time of the digest information. Moreover, although the present embodiment includes three levels, a different number of levels with different levels of details may be utilized, including one level. Accordingly, if there are multiple levels, the user can select a level using a user interface.

Thus, a digest stream is provided to the user terminal 2 using the digest information structure shown in FIG. 4. The digest stream can be constructed by the two following methods.

First, if there is only one level or if a user selects one of a multiple levels predetermined by the VOD system, the VOD system provides a highlight stream from the corresponding level by sequentially displaying the sections of appropriate time period in the selected level. In other words, a video digest information of the contents of the previously viewed video program is displayed by sequentially connecting the important sections from the beginning to the interrupted position of the video program.

Second, if a user selects one of a multiple levels predetermined by the VOD system, the VOD system provides a highlight stream from the corresponding level by sequentially displaying the important sections of the selected level as well as either the levels higher than the selected level. To provide a highlight stream in the second manner, each level should be constructed with sections, i.e. segments, which are mutually exclusive from other levels.

FIG. 5 shows another digest information structure where further information, i.e. text annotation, is provided in addition to the video segments of the digest information in FIG. 4. According to this digest information structure, the text information may be displayed as a caption while the important sections of the previously viewed portion of the video program is being displayed. Accordingly, the user can understand the past contents of the interrupted video program in more detail.

Referring to FIG. 5, one text annotation may be connected to one section, i.e. segment, or commonly to several sections. Accordingly, one text annotation can be continuously displayed as a caption during several sequential sections.

Although the preferred embodiment includes video segments, the digest information may also be composed entirely of text information. Also, even if the digest information is composed of both video and text annotations, only the text information or the video may be displayed, depending upon the selection of a user through a user interface.

Furthermore, in addition to the digest information as described with reference to FIGS. 4 and 5, a method of displaying a moving image at a predetermined high speed can be used as a digest information. Namely, the digest information would be a display of the program at the predetermined high speed from the start position to the position at which the viewing was interrupted. At this time, the display speed may be predetermined differently for each section depending upon factors such as a change of scene and amount of motion. For example, sections with insignificant change of scene or motion would be displayed relatively at a high speed, while sections with frequent change of scene or large motion would be displayed at a relatively low speed.

In sum, according to the present invention, the user can resume viewing of a specific video program from the portion at which it was interrupted by the user by requesting the viewing of the interrupted video program to any video servers. Since the user manages the interruption position information of the video programs in the form of a video profile, the load of the video server can also be greatly reduced. Finally, since the user can view the contents of the previously viewed video program in the form of a moving image and/or text, the user can easily understand the whole contents of the video program.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video-on-demand system comprising:
    a video server, wherein the video server comprises,
        a video database which manages a plurality of video programs and stores digest information corresponding to the video programs,
        a control unit which controls a transmission to a user terminal of a selected video program from the video database, based upon a user request and user profile information from said user terminal, and which generates a highlight stream of said selected video program up to an interrupted position of said selected video program using digest information of said selected video program upon interruption of a display of said selected video, and wherein said user profile information includes an ID and corresponding position information of said selected video program that has been interrupted, and
        a buffer which temporarily stores the video program and transmits a video stream of the stored video program to the user terminal under the control of the control unit, wherein the buffer temporarily stores the highlight stream from the control unit and transmits said highlight stream to the user terminal under the control of the control unit, and wherein the highlight stream has a structure with multiple levels of details, each level comprising a plurality of video segments and each segment summarizing contents in a portion of a corresponding video program, wherein said control unit stops said transmission, generates said highlight stream and stores said highlight stream in said video server directly responsive to a user stop request for said selected video program from said user terminal.

2. The system of claim 1, wherein the control unit provides the highlight stream from one level by sequentially connecting video segments from the beginning to an interrupted position of the video program, based upon the user profile information.

3. The system of claim 1, wherein the control unit provides the highlight stream from a level selected by the user and from levels of greater detail, if any, by sequentially interconnecting video segments from the beginning to an interrupted position of the video program, based upon the user profile information.

4. The system of claim 1, wherein a text annotation is connected to one or more video segments and is transmitted as a part of the highlight stream to the user terminal for display.

5. A method of providing service by a video-on-demand system comprising:
    managing and storing a plurality of video programs with digest information corresponding to the video programs in a database of a video server terminal;
    controlling a transmission to a user terminal of a selected video program from the database, based upon a user viewing request and user information from said user terminal;
    temporarily storing the selected video program from the video database and transmitting a video stream to the user terminal;
    receiving and storing the video stream in the user terminal; and
    decoding and displaying the video data at the user terminal, wherein said controlling a transmission to the user terminal of the selected video program comprises,
        interrupting the transmission to the user terminal of the selected video program from the database responsive to a user interruption request and the user information from said user terminal;
        generating and storing in the video server terminal a highlight stream of said selected video program up to an interrupted position of the selected video program using said digest information of said selected video program; and
        transmitting user profile information to said user terminal, wherein the user profile information includes user profile, identification of the selected video program and information of said interrupted position of the selected video program,
        writing the user profile information in a profile card of the user terminal, and
        sending the user profile information and a user resume request for the selected video program to the video server, wherein the controlling comprises operating a first video server, and wherein the sending comprises:
            removing the profile card from the user terminal,
            inserting the user profile card in a second user terminal,
            transmitting the user profile information to a second video server of the video server terminal, wherein the second video server is different from the first video server, and
            resuming transmission to said user of remaining portions of the selected video program, wherein said resuming transmission comprises transmitting said highlight stream of the selected video.

6. The method of claim 5, comprising:
    directly transmitting at least a portion of said previously stored highlight stream followed by at least a portion of said selected video program that occurs in the selected video program after said interrupted position in the selected video program responsive to a user resume request from said user terminal being received at the video server terminal.

7. The system of claim 1, wherein said control unit directly transmits at least a portion of said previously stored highlight stream followed by at least a portion of said selected video program that occurs in the selected video program after said interrupted position in the selected video program responsive to a user resume request from said user terminal being received at the video server.

* * * * *